United States Patent
Kim

[11] Patent Number: 5,889,755
[45] Date of Patent: Mar. 30, 1999

[54] PICKUP ADJUSTING APPARATUS OF AN OPTICAL DISK PLAYER

[75] Inventor: Sang-tae Kim, Suwon, Rep. of Korea

[73] Assignee: Samsung Electronics Co., Ltd., Kyungki-do, Rep. of Korea

[21] Appl. No.: 683,198

[22] Filed: Jul. 18, 1996

[30] Foreign Application Priority Data

Jun. 27, 1996 [KR] Rep. of Korea .................. 1996-24411

[51] Int. Cl.$^6$ .............................. G11B 7/08; G11B 21/02
[52] U.S. Cl. ............................. 369/219; 369/244
[58] Field of Search .................... 369/215, 219, 369/220, 244, 249, 258, 44.14, 44.15, 44.16, 44.21, 44.22; 359/814, 823, 824

[56] References Cited

U.S. PATENT DOCUMENTS

| | | | |
|---|---|---|---|
| 4,996,619 | 2/1991 | Negishi et al. | 360/106 |
| 5,058,097 | 10/1991 | Suzuki et al. | 369/219 |
| 5,615,204 | 3/1997 | Watanabe et al. | 369/219 |

FOREIGN PATENT DOCUMENTS

| | | | |
|---|---|---|---|
| 63-113874 | 5/1988 | Japan | 369/244 |
| 63-188831 | 8/1988 | Japan | 369/244 |
| 2-214024 | 8/1990 | Japan | 369/244 |
| 2-244431 | 9/1990 | Japan | 369/244 |
| 4-109433 | 4/1992 | Japan | 369/244 |
| 2 217 094 | 10/1989 | United Kingdom | 369/219 |

*Primary Examiner*—John H. Wolff
*Assistant Examiner*—David L. Ometz
*Attorney, Agent, or Firm*—Sughrue, Mion, Zinn, Macpeak & Seas, PLLC

[57] ABSTRACT

A pickup adjusting apparatus of an optical disk player having a pair of guide rails for supporting and guiding a pickup. An adjusting device is provided for moving ends of the guide rails horizontally with respect to a disk surface. The adjusting device includes a supporting member for supporting the end of each of the guide rails, and allowing the guide rails to move horizontally with respect to the disk surface, a cam rotatably installed on a deck for supporting a side of each guide rail, and an elastic member contacting each guide rail opposite the cam to bias each guide rail toward the cam.

2 Claims, 4 Drawing Sheets

PICKUP ADJUSTING APPARATUS OF AN OPTICAL DISK PLAYER

BACKGROUND OF THE INVENTION

1. Field of the Invention

The present invention relates to a pickup adjusting apparatus for adjusting the position of a pickup in an optical disk player so that optimal pickup positioning is obtained between the pickup and a disk.

2. Description of the Related Art

FIG. 1 shows the pickup portion of a typical optical disk player in which a turntable 2 for receiving a disk (not shown) is installed at one side of a deck 1, and a parallel pair of guide rails 3 are fixedly supported by fixing portions 10 next to the turntable 2. A pickup 5 is slidably supported on the guide rails 3 to be movable along the same, and a tooth gear portion (not shown) engaged with a screw shaft 8 is formed at one side of the pickup 5. The screw shaft 8 is rotatably supported by supports 7. Accordingly, when the screw shaft 8 is rotated by the driving of a motor 4, the pickup 5 moves in a radial direction of the disk to reproduce information recorded on the disk in a known manner while moving along the guide rails 3.

In order to properly reproduce information recorded on the disk, the pickup 5 should move radially in a straight line from the center of the disk. However, manufacturing errors can occur which result in the pickup 5 deviating from the radial path from the disk center. These errors can be minimized by increasing the accuracy in parts design and product assembly. However, there is a limit to a reduction of these errors when the assembly allowance is high.

Furthermore, since an additional means for correcting these errors after assembly is not provided in the conventional disk player, such errors are corrected only by the focusing and tracking functions of the pickup 5. However, this requires excessive control of the focusing and the tracking servo, thus rendering the reproduction of information on a disk unstable.

SUMMARY OF THE INVENTION

To solve the above problems, it is an object of the present invention to provide a pickup adjusting apparatus of an optical disk player which enables accurate adjustment of a pickup by moving the guide rails that support the pickup such that optimal pickup conditions can be obtained between the pickup and a disk.

Accordingly, to achieve the above object, there is provided a pickup adjusting apparatus of an optical disk player having a pair of guide rails for supporting and guiding a pickup, comprising an adjusting means for moving ends of the guide rails horizontally with respect to a disk surface.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

Figure 1:
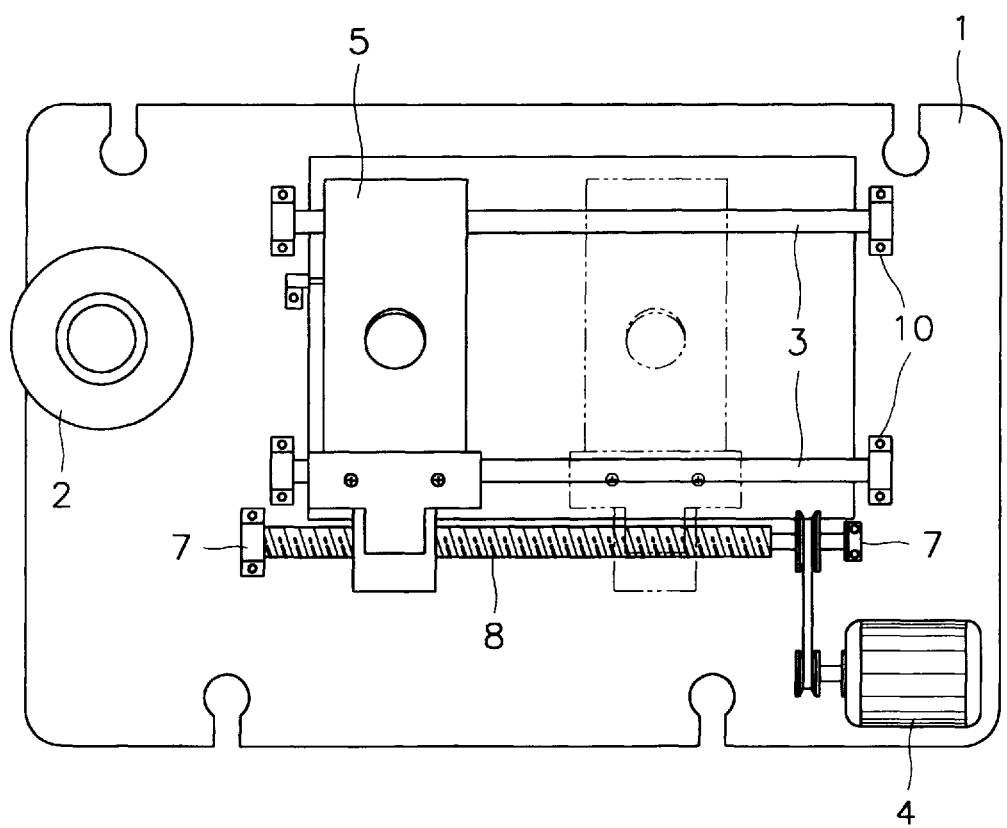
FIG. 1 is a plan view schematically illustrating the pickup portion of a conventional disk player.
Figure 2:
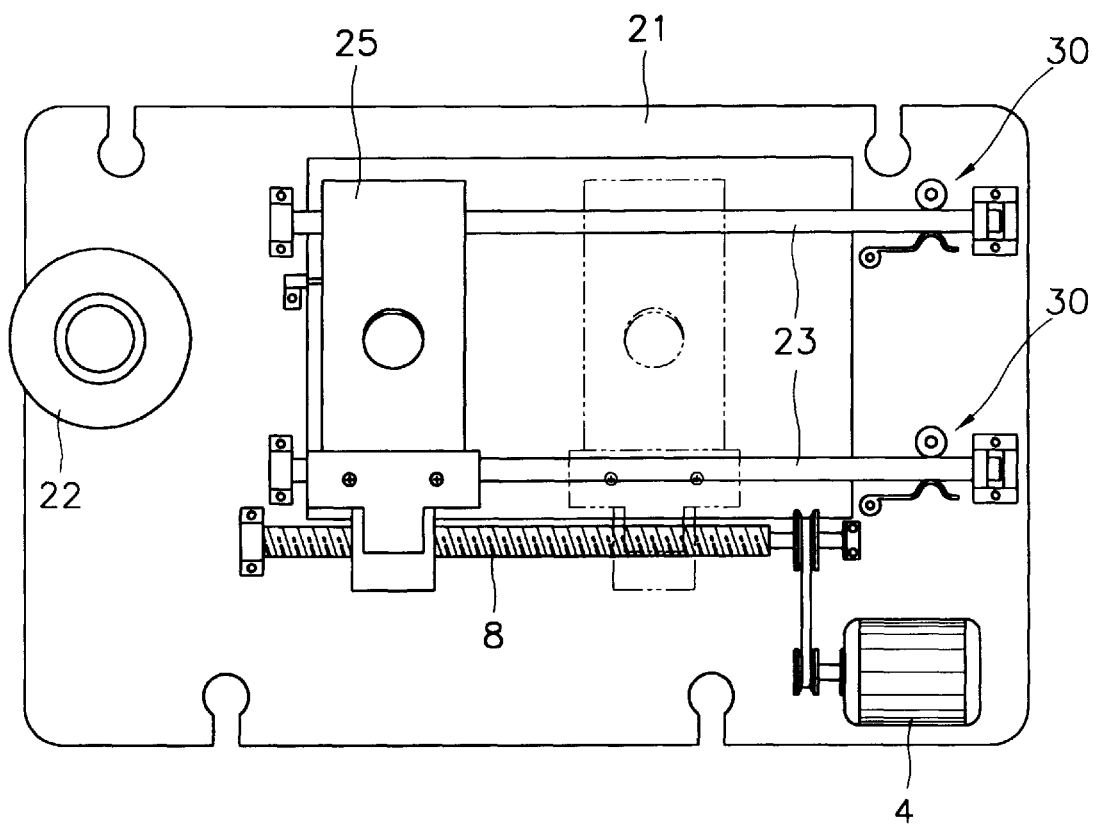
FIG. 2 is a plan view schematically illustrating the pickup portion of an optical disk player equipped with a pickup adjusting apparatus according to a preferred embodiment of the present invention.

FIG. 2 shows an optical disk player having a pickup adjusting apparatus according to a preferred embodiment of the present invention. A turntable 22 for receiving a disk (not shown) is installed on a deck 21. A pair of guide rails 23 is supported by fixing portions 20 at one end of each of the guide rails 23 respectively. Position adjusting means 30 respectively support opposite ends of the guide rails 23. A pickup 25 is slidably supported on the guide rails 23.

Figure 3:
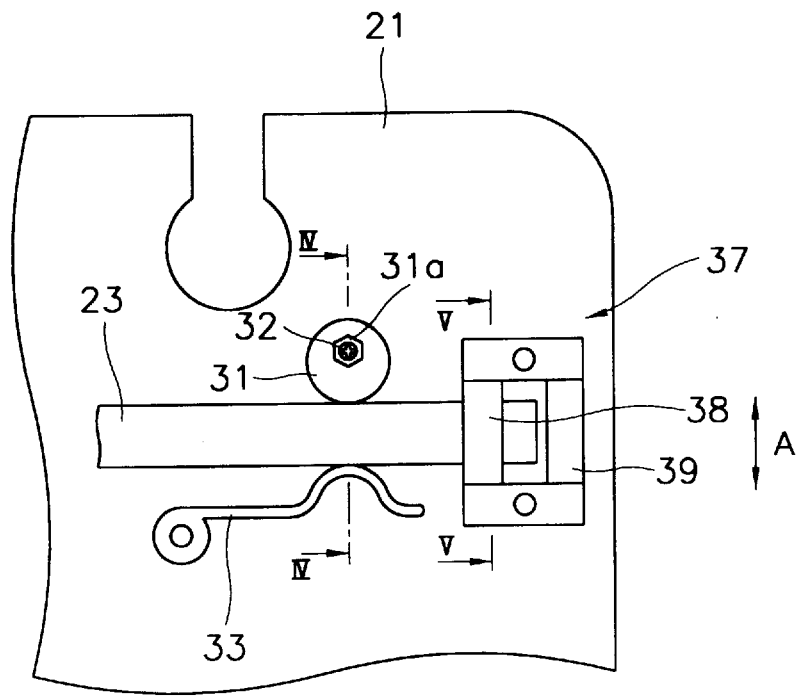
FIG. 3 is a plan view schematically illustrating a pickup adjusting apparatus according to the preferred embodiment of the present invention.

Referring to FIG. 3, each of the position adjusting means 30 includes a supporting member 37 for supporting the guide rail 23 and allowing movement thereof in the directions indicated by double-headed arrow A, a cam 31 having an eccentric center of rotation rotatably installed on the deck 21 for supporting one side of the guide rail 23, and an elastic member 33 for elastically biasing the guide rail 23 toward the cam 31 by pressing a side of the guide rail 23 opposite the cam 31.

Figure 5:
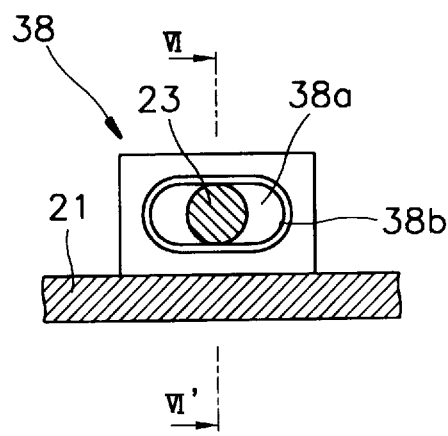
FIG. 5 is a sectional view taken along line V—V of FIG. 3.
Figure 6:
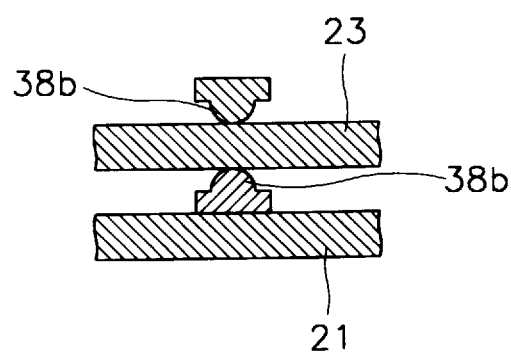
FIG. 6 is a sectional view taken along lines VI—VI of FIG. 5.

Referring to FIGS. 3, 5 and 6, each supporting member 37 is fixed to the deck 21 and comprises a bracket 38 having a slot 38a into which the guide rail 23 is inserted and supported and a blocking portion 39 for preventing the guide rail 23 from exiting slot 38a in a lengthwise direction thereof.

Figure 4:
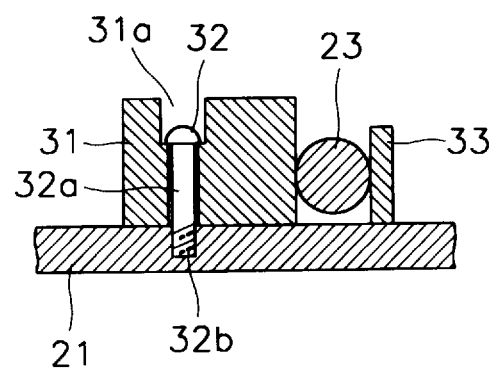
FIG. 4 is a sectional view taken along line IV—IV of FIG. 3.

The guide rail 23 is inserted into the slot 38a and thus can be moved a predetermined distance only in the horizontal direction along the slot 38a. A protrusion 38b for supporting the guide rail 23 is formed in edges of slot 38a so that the surface area of contact with the guide rail 23 is minimal. The cam 31 contacting the side of the guide rail 23 is rotatably mounted on the deck 21 by a screw 32. See FIG. 4. The screw 32 fits in a hexagonal groove 31a formed in the cam 31 and has an unthreaded portion 32a so that the cam portion 31 can be rotated and a threaded portion 32b for engagement with the deck 21. The hexagonal groove 31a and hole of the cam 31 is off-center so that the cam 31 will have an eccentric rotation.

The elastic member 33, installed at the side opposite the cam 31 with respect to the guide rail 23, elastically biases the guide rail 23 toward the cam 31 and simultaneously prevents movement of the guide rail 23 due to vibration or the like. Of course, the shape and structure of the elastic member 33 is not limited to that of the preferred embodiment but can be any shape or structure that serves to bias the guide rail 23 against the cam 31.

In operation, when the cam 31 is rotated by inserting an Allen wrench or other tool (not shown) into the groove 31a of the cam 31, the guide rail 23 can be moved horizontally with respect to the disk surface since the distance from the fixed center of rotation of the cam 31 to the outer surface contacting the guide rail 23 changes as the cam 31 is rotated. Accordingly, the pickup 25 (see FIG. 2) supported by the guide rail 23 can be moved horizontally in minute increments so error between the pickup 25 and the disk can be corrected. Cam 31 is held in rotational position by friction or any other means.

As described above, in the pickup adjusting apparatus of an optical disk player according to the present invention the pickup can be adjusted so that a focusing and tracking servo mechanism can be more reliable and reproduction efficiency of the optical disk player can be improved.

It is noted that the present invention is not limited to the preferred embodiment described above, and it is apparent that variations and modifications by those skilled in the art can be effected within the spirit and scope of the present invention defined in the appended claims.

What is claimed is:

1. A pickup adjusting apparatus of an optical disk player having a deck which defines a main deck surface, comprising:

at least one guide rail for supporting and guiding a pickup; and an adjusting device which comprises:

a supporting member for supporting an end of said at least one guide rail and allowing said at least one guide rail to move horizontally with respect to a disk surface;

a cam rotatably installed on the deck for rotation about an axis perpendicular to the main deck surface of the deck and for supporting a first side of said at least one guide rail by contacting said first side; and an elastic member contacting a second side of said at least one guide rail that is opposite said first side and thereby biasing said at least one guide rail toward said cam, said adjusting device being operative for moving said end of said at least one guide rail horizontally with respect to the disk surface, wherein there are two of said guide rails, and wherein there are two of said adjusting devices, with each of said guide rails having a corresponding one of said adjusting devices, said supporting member of each adjusting device comprising:

a bracket having a slot formed therein, said slot extending horizontally with respect to said disk surface, said end of a corresponding one of said guide rails being inserted in said slot; and a blocking portion for preventing the corresponding one of said guide rails from exiting said slot in a lengthwise direction of said guide rails.

2. The pickup position adjusting apparatus of an optical disk player as claimed in claim 1, wherein a hexagonal groove is formed in an upper portion of said cam.

\* \* \* \* \*